(12) United States Patent
Beaston

(10) Patent No.: US 6,933,624 B2
(45) Date of Patent: Aug. 23, 2005

(54) HYDROPOWER GENERATION APPARATUS AND METHOD

(76) Inventor: Steven D. Beaston, P.O. Box 39, Delaware City, DE (US) 19706

( * ) Notice: Subject to any disclaimer, the term of this patent is extended or adjusted under 35 U.S.C. 154(b) by 0 days.

(21) Appl. No.: 10/882,466

(22) Filed: Jul. 2, 2004

(65) Prior Publication Data

US 2005/0079015 A1 Apr. 14, 2005

Related U.S. Application Data

(63) Continuation-in-part of application No. 10/682,091, filed on Oct. 10, 2003, now Pat. No. 6,831,373.

(51) Int. Cl.[7] .............................. F03B 13/10; E02B 9/08
(52) U.S. Cl. ............................ 290/43; 290/44; 290/52; 290/53; 290/54
(58) Field of Search ............................. 290/43, 44, 52, 290/54, 53

(56) References Cited

U.S. PATENT DOCUMENTS

| | | | |
|---|---|---|---|
| 659,609 A | 10/1900 | McIntyre | |
| 1,139,995 A | 5/1915 | Osterholtz | |
| 1,570,421 A | 1/1926 | Abraham | |
| 3,485,038 A | 12/1969 | Martin et al. | |
| 3,961,479 A | 6/1976 | Anderson | |
| 3,983,702 A | 10/1976 | Reid | |
| 4,083,186 A | 4/1978 | Jackson, Sr. | |
| 4,123,185 A | * 10/1978 | Hagen et al. | ................. 405/76 |
| 4,242,868 A | 1/1981 | Smith | |
| 4,267,695 A | 5/1981 | Micciche | |
| 4,472,937 A | 9/1984 | Isamu | |
| 4,583,368 A | 4/1986 | Neuenschwander | |
| 4,586,333 A | 5/1986 | Reid | |
| 4,599,857 A | 7/1986 | Kim et al. | |
| 4,674,281 A | 6/1987 | Kim et al. | |
| 4,691,514 A | 9/1987 | Smith | |
| 4,720,976 A | 1/1988 | Kim et al. | |
| 4,726,188 A | 2/1988 | Woolfolk | |
| 4,739,182 A | 4/1988 | Kenderi | |
| 4,746,244 A | 5/1988 | Broome | |
| 4,838,025 A | 6/1989 | Nelis | |
| 5,374,850 A | 12/1994 | Cowen | |
| 5,458,250 A | * 10/1995 | Martinez | .................... 212/271 |
| 5,889,336 A | 3/1999 | Tateishi | |
| 5,909,060 A | * 6/1999 | Gardner | ....................... 290/53 |
| 6,476,512 B1 | * 11/2002 | Rutta | ......................... 290/42 |
| 6,831,373 B1 | * 12/2004 | Beaston | ....................... 290/43 |

* cited by examiner

*Primary Examiner*—Nicholas Ponomarenko
*Assistant Examiner*—Iraj A. Mohandesi
(74) *Attorney, Agent, or Firm*—Hall, Myers, Vande Sande & Pequignot

(57) ABSTRACT

Apparatus and methods for generating power utilizing the flow of water from an upper water body to a lower water body in order to generate an upward buoyant force on at least one buoyant object located in a chamber. In preferred embodiments, water is recycled between at least two chambers which generate upward and downward strokes of at least two buoyant objects.

23 Claims, 4 Drawing Sheets

US 6,933,624 B2

HYDROPOWER GENERATION APPARATUS AND METHOD

RELATED APPLICATION DATA

This application is a continuation-in-part of U.S. patent application Ser. No. 10/682,091, filed Oct. 10, 2003 now U.S. Pat. No. 6,831,373, similarly titled, and invented by Steven D. Beaston, the text of which is hereby incorporated by reference.

FIELD OF THE INVENTION

This invention relates to apparatus and methods for generating power utilizing the flow of water from an upper water body to a lower water body in order to generate an upward buoyant force on at least one buoyant object located in a chamber. In preferred embodiments, water is recycled between at least two chambers which generate upward and downward strokes of at least two buoyant objects.

BACKGROUND OF THE INVENTION

Because the supply of fossil fuels, natural gas, and other natural fuels is finite and because the processing and/or consumption of such fuels produces significant detrimental amounts of pollution, alternatives to such fuels have been experimented with, and in some cases implemented over the years. The need for alternatives to such natural, pollution producing fuels is further compounded by the rapidly expanding population of the Earth which is increasing the consumption of such fuels at a exponential rate.

As a result, heretofore, various alternatives to such fuels have been experimented with over the years. For example, many attempts have been made at harnessing the power of solar energy, water energy, or so-called non-polluting gases such as hydrogen. In this regard, although various hydropower machines have been developed and/or proposed in recent times, few of these machines have been successful in practical application, a notable exception being a conventional turbine (i.e. located at a dam). Examples of such hydropower machines are exemplified by U.S. Pat. Nos. 659,609; 3,983,702; 4,586,333; and 4,720,976. It is believed that known hydropower devices, such as those disclosed in the aforementioned patents, are not often, if at all, commercially employed primarily due to complexity, inherent inefficiencies, and/or exorbitant manufacturing or maintenance costs.

In view of the above-enumerated drawbacks, it is apparent that there exists a need in the art for apparatus and/or methods which overcomes at least one of the above drawbacks. It is a purpose of this invention to fulfill these needs in the art, as well as other needs which will become apparent to the skilled artisan once given the above disclosure.

SUMMARY OF THE INVENTION

Generally speaking, this invention fulfills the above-described needs in the art by providing: hydropower generation apparatus comprising:

a first chamber having at least one inlet for introducing water therein and at least one outlet for evacuating water therefrom;

a first buoyant object located in the first chamber, the first buoyant object communicating with a power extraction mechanism for extracting generated power;

a second chamber having at least one inlet for introducing water therein and at least one outlet for evacuating water therefrom;

a second buoyant object located in the second chamber, the second buoyant object communicating with the power extraction mechanism;

the first chamber having at least one inlet selectively fluidly connected to an outlet of the second chamber;

the second chamber having at least one inlet selectively fluidly connected to an outlet of the first chamber;

wherein introducing water into the first chamber causes the first buoyant object to rise in the first chamber thereby causing an upstroke to generate power;

wherein evacuating water from the second chamber causes the second buoyant object to fall in the second chamber thereby causing a downstroke to generate power;

wherein introducing water into the second chamber causes the second buoyant object to rise in the second chamber thereby causing an upstroke to generate power;

wherein evacuating water from the first chamber causes the first buoyant object to fall in the first chamber thereby causing a downstroke to generate power;

wherein the first chamber is capable of selectively evacuating water to the second chamber to assist in an upstroke of the second buoyant object in the second chamber, and the first chamber is capable of selectively evacuating water from the first chamber to a lower water body; and wherein the second chamber is capable of selectively evacuating water to the first chamber to assist in an upstroke of the first buoyant object in the first chamber, and the second chamber is capable of selectively evacuating water from the second chamber to a lower water body.

In further embodiments, there is provided:

hydropower generation apparatus comprising:

at least one chamber having at least one inlet for introducing water therein and at least one outlet for evacuating water therefrom;

a buoyant object located in the chamber, the buoyant object communicating with a power extraction mechanism for extracting generated power;

wherein introducing water into the chamber causes the buoyant object to rise in the chamber thereby causing an upstroke to generate power;

wherein evacuating water from the chamber causes the buoyant object to fall in the chamber thereby causing a downstroke to generate power;

wherein the buoyant object includes at least one ballast compartment and at least one ballast valve for opening and closing the ballast compartment, wherein the ballast valve of the ballast compartment is operable to take on water in order to increase the weight of the buoyant object during the downstroke and the ballast valve is operable to evacuate water from the ballast compartment in order to decrease the weight of the buoyant object during the upstroke.

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

Figure 1:
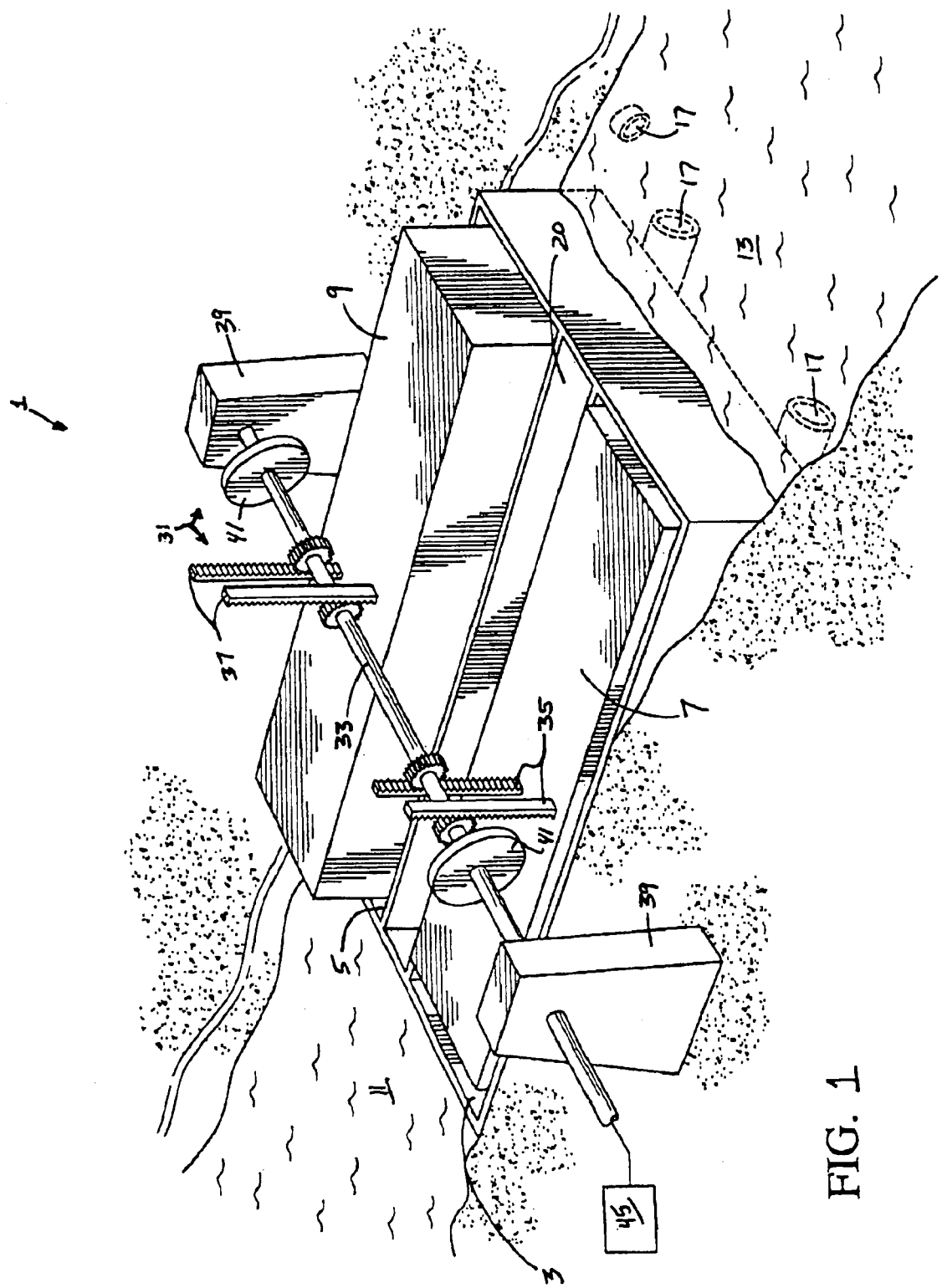
FIG. 1 is a three-dimensional perspective view of one embodiment of the hydropower apparatus according to the subject invention.
Figure 2:
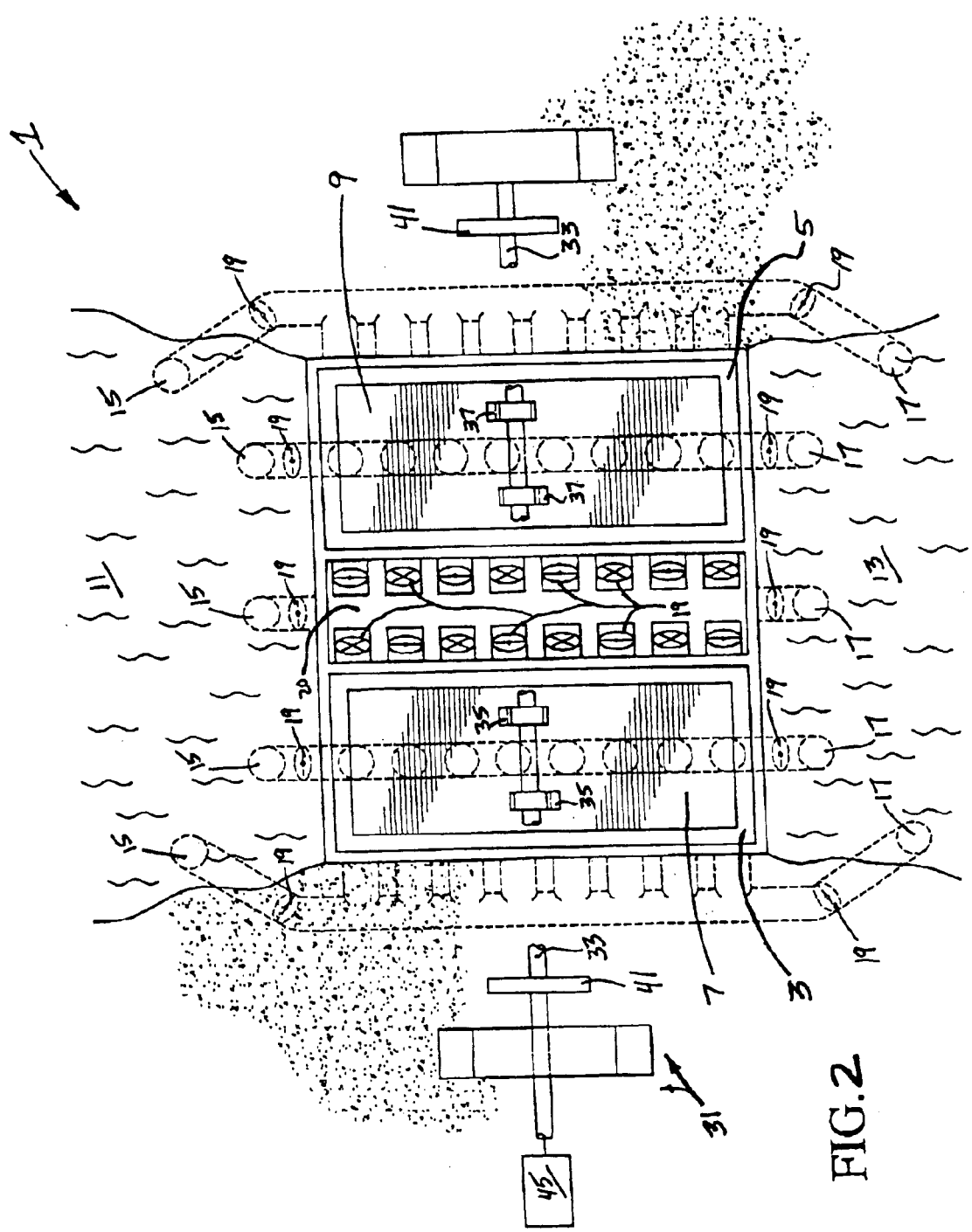
FIG. 2 is an overhead, plan view of the embodiment illustrated in FIG. 1 with certain parts shown in x-ray.

Referring initially to FIGS. 1 and 2, an exemplar embodiment of a hydropower apparatus 1 according to the subject invention is illustrated therein. Generally speaking, hydropower apparatus 1 comprises first and second water holding chambers 3 and 5 which contain first and second buoyant objects 7 and 9 respectively. In the illustrated embodiment, chambers 3 and 5 are large rectangular cavities, the dimensions of which can be selected according to various factors including cost, the amount of power to be generated, or the space availability at the site location. Example dimensions for the cavities as contemplated for practical use are 600× 200 feet. Buoyant objects 7 and 9 are preferably sized so that, when installed in the chambers, the tolerances between the walls of the chambers and walls of the buoyant objects are minimized. In this regard then, in an example embodiment, the preferred dimensions and shape of the buoyant objects are roughly equivalent to the dimensions and shape of the interiors of chambers 3 and 5 minus approximately 0.01–5%. Using such close tolerances, the amount of water which must be introduced into chambers 3 and 5 to produce an upward stroke of buoyant objects 7 and 9 is minimized.

In preferred embodiments, rollers or similar mechanisms are installed in the chamber walls guiding buoyant objects 7 and 9 (or between the walls and the buoyant objects) thereby to assist in producing smooth, level upward and downward strokes during operation.

As can be seen most clearly in FIG. 2, each chamber 3 and 5 includes a plurality of inlets 15 and outlets 17 for introducing water into the chambers to produce upstrokes and for evacuating water from the chambers to produce downstrokes. Although no particular design of such inlets and outlets is required, it is preferred that the both inlets and outlets 15 and 17 have high flow rates and be sufficient in number so that chambers 3 and 5 can be filled and drained quickly, and in preferred embodiments, substantially instantaneously (e.g. over a period of one to several seconds). Inlets and outlets with large diameters are therefore preferred. In order to further assist in efficient filling and draining of the chambers, it is important, in preferred embodiments, that hydropower apparatus 1 be located at the intersection (or between) an upper water body 11 and a lower water body 13. More specifically, it is preferred that chambers 3 and 5 be located at an intermediate elevation between the greater elevation of upper water body 11 and lesser elevation of lower water body 13. In this manner, chambers 3 and 5 can be filled and drained using the flow of water due to gravitational forces. In order to accomplish such gravitational filling and draining, inlets 15 are positioned so that they are in fluid contact with upper water body 11 and outlets 17 are located so that they are in fluid contact with lower water body 13 (the piping of the inlets and outlets is, of course, oriented at appropriate angles to achieve efficient inflow and outflow of water to and from the chambers).

Figure 4:
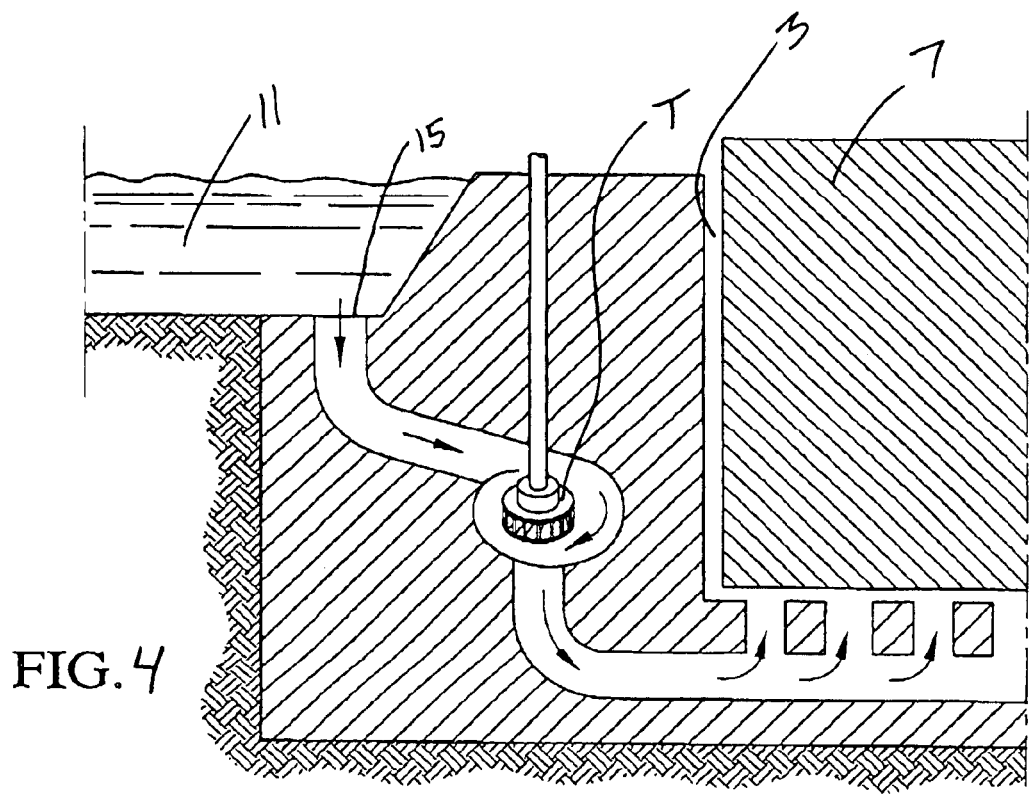
FIG. 4 is a diagrammatic profile view of an alternative embodiment of the hydropower apparatus illustrated in FIG. 1 showing a turbine located to interact with water inflow.
Figure 5:
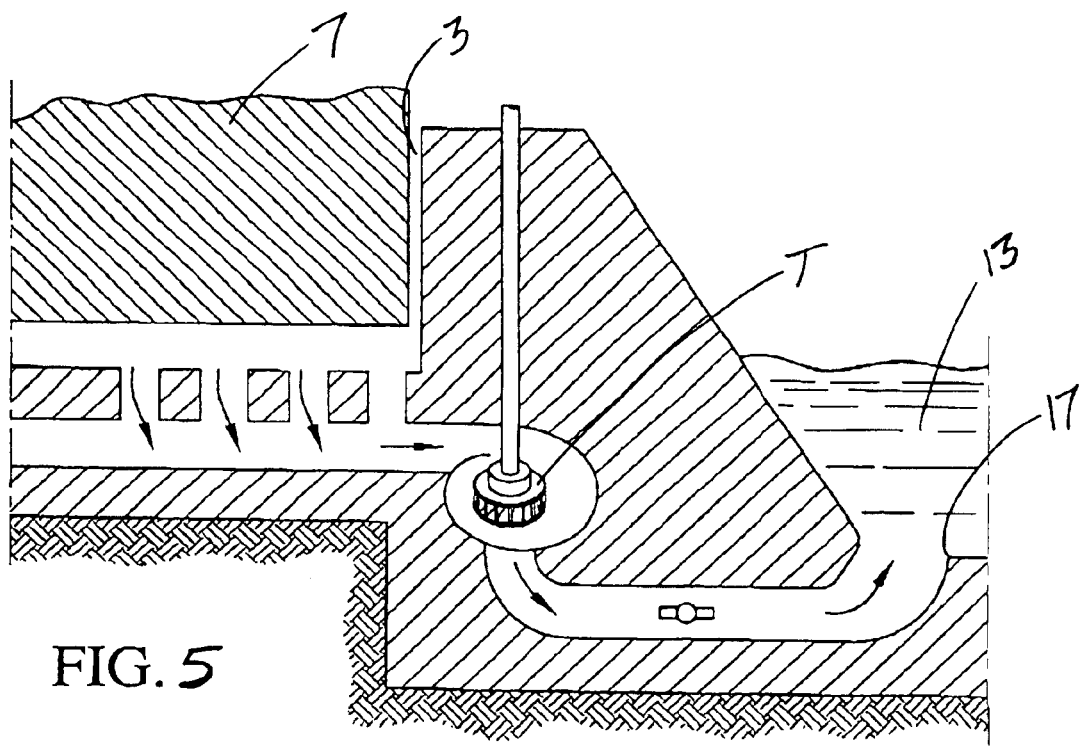
FIG. 5 is a is a diagrammatic profile view of an alternative embodiment of the hydropower apparatus illustrated in FIG. 1 showing a turbine located to interact with water outflow.

In at least one alternative embodiment (i.e. illustrated in FIGS. 4 and/or 5), a turbine T (or plurality of turbines) is located in fluid flow communication between upper water body 11 and one of inlets 15 (FIG. 4) and/or in fluid flow communication between one of outlets 17 and lower water body 13 (FIG. 5). In such an embodiment, power can be generated prior to and/or after water enters and exits chambers 3 and/or 5 thereby supplementing the power generated in the steps enumerated in detail above and in the paragraphs which follow below. Examples of specific turbines which may be useful in such an embodiment are reaction-type turbines (e.g. a Francis turbine) and/or a propeller-type turbine (e.g. a Kaplan turbine). It is noted, of course, that the use of other turbine types is contemplated and, as such, are preferably selected according to practical considerations such as size, cost, or efficiency.

In order to regulate inflow and outflow of water, a plurality of valves 19 are provided (some of which are illustrated diagrammatically in the drawings) which can be opened or closed as desired. Such valves, in effect, control the operation of the invention by controlling the filling and draining of chambers 3 and 5 and thereby controlling the upstrokes and downstrokes of buoyant objects 7 and 9. In preferred embodiments, butterfly type valves are employed, however, any valve capable of high flow rates and quick opening and closing may, of course, be use.

As may further be seen in FIG. 2, chambers 3 and 5 are selectively fluidly interconnected via a manifold 20 located between the two chambers. In order to achieve fluid connectivity, valves 19 can be opened or closed on either side of the manifold (where they are seated in opposing walls of chambers 3 and 5). In particular, valves 19, located in manifold 20, enable the unique recycling feature of the subject invention which will be described in more detail in the paragraphs below. It is additionally noted that manifold 20 includes its own inlet 15 and outlet 17 which can be used in concert with valves 19 to increase chamber filling and evacuating rates as desired.

Referring again to FIGS. 1 and 2, pedestals 39 are, in preferred embodiments, located on either side of hydropower apparatus 1 and support a rotatable shaft 33 carrying a pair of flywheels 41. In the illustrated embodiment, rotatable shaft 33 is in communication with vertical shafts 35 and 37 (e.g. via one-way ratcheting-type gears or clutched gears) extending from buoyant objects 7 and 9, respectively, thus forming a power extraction mechanism 31 for extracting power generated by upstrokes and downstrokes of buoyant objects 7 and 9. As may be expected, when vertical shafts 35 and 37 stroke upwards or downwards with buoyant objects 7 and 9, their interaction with shaft 33 causes it to rotate correspondingly (due to the splined interconnection). Although not illustrated, shaft 33 is preferably connected to a power generator device 45 (e.g. via a series of gears, etc.).

It is importantly noted that no specific power extraction mechanism or power storage mechanism is contemplated for exploiting the power generation features of the subject invention. In this regard, power extraction mechanism 31 is merely illustrated to demonstrate one possible manner of extracting power from apparatus 1. It is acknowledged, however, that other conventional or known power extraction mechanisms may be more efficient, more reliable, or more cheaply or easily constructed. In this regard, one example of a substitute power extraction mechanism which could be employed in combination with the subject invention is described in U.S. Pat. No. 659,609, issued to Joseph J. McIntyre, and entitled *WAVE AND TIDAL ENGINE*.

Figure 3A:
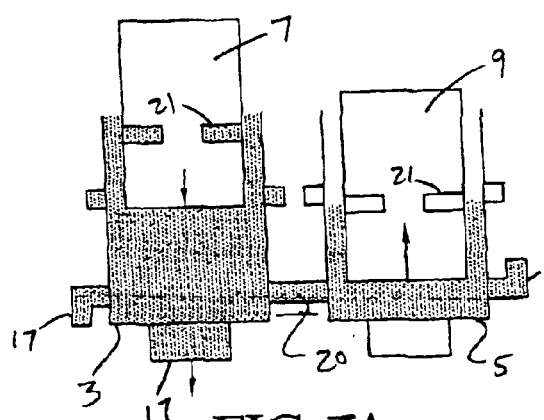
FIGS. 3A, 3B, 3C, 3D, 3E, and 3F sequentially illustrate the operation of the apparatus illustrated in FIG. 1, in diagrammatic form, recycling water back and forth between first and second chambers to produce upward and downward strokes of first and second buoyant objects.

At a hypothetical starting point in preferred operation of the subject device as illustrated in FIG. 3A, water is first introduced into chamber 5 thereby to cause an upstroke of buoyant object 9 residing therein. In normal operation, chamber 3 will already have been filled and therefore will be evacuated of water substantially simultaneously with the filling of chamber 5. Filling and evacuating occurs through inlets and outlets 15 and 17, respectively, as well as through manifold 20. As discussed only briefly above, manifold 20 may be used to boost filling and evacuating rates. This is accomplished in preferred embodiments by the opening of valves 19 in the manifold on the walls of both chambers. When the valves are opened as such, water from the chamber which is full (e.g. chamber 3 in FIG. 3A) will drain rapidly into the manifold and thereafter pass through the valve located on the wall of the opposite chamber (e.g. chamber 5 in FIG. 3A) thereby to effect an filling thereof. It is noted, of course, that when the water in the two chambers is at equal heights, water from the manifold will no longer continue to fill the "filling" chamber (i.e. because an effective equilibrium has been reached between the chambers). Therefore, manifold valves 19 on the chamber which is being filled should be closed at the achievement of equilibrium between the chambers, while the inlets 15 of the "filling" chamber remain open. In this manner, the draining chamber assists the upstroke of the filling chamber, and when equilibrium between the chambers is reached, the inlets complete the filling thereof. This operational process is illustrated in detail in the sequence of FIGS. 3A, 3B, and 3C.

It is noted that, in theory, the "filling" chamber can accept exactly half of the volume of the "draining" chamber before equilibrium is reached. In practice, however, less than half of the volume of water is transferred from one side to another simply because inlets 15 are assisting in filling and therefore accounting for a portion of the equilibrium water level achieved.

It is further noted that once valves 19 of the "filling" chamber are closed, water continues to drain from the draining chamber both into manifold 20 having its own outlet and out of the remaining outlets 17 situated around the periphery of chamber 3. It is still further noted that it is advantageous to locate filling and draining valves 19 opposite one another on opposing manifold/chamber walls. In this manner, flow from one chamber to another is most efficient due to reduction in frictional forces (by minimizing the obstruction of water flow).

Figure 3D:
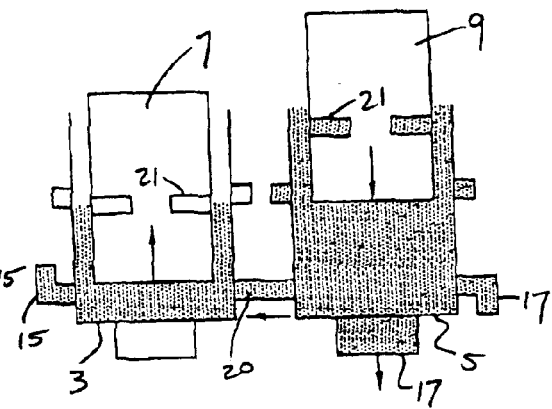
Figure 3B:
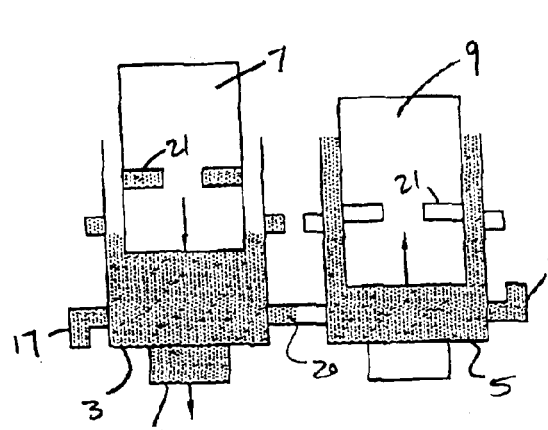
Figure 3E:
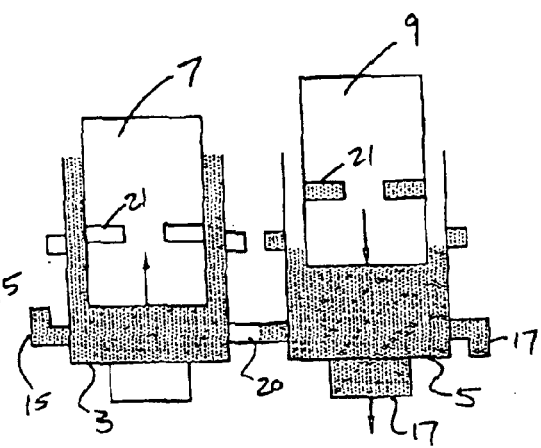
Figure 3C:
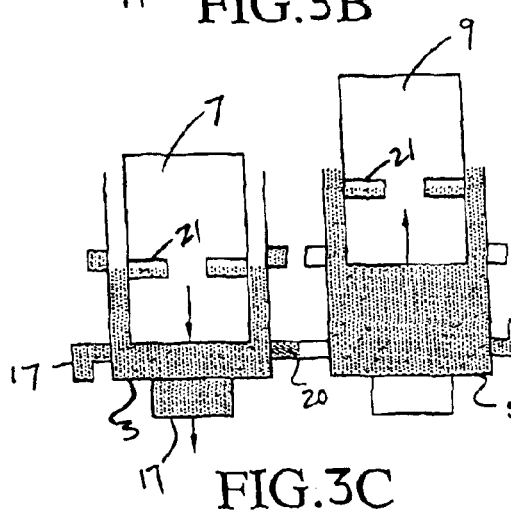
Figure 3F:
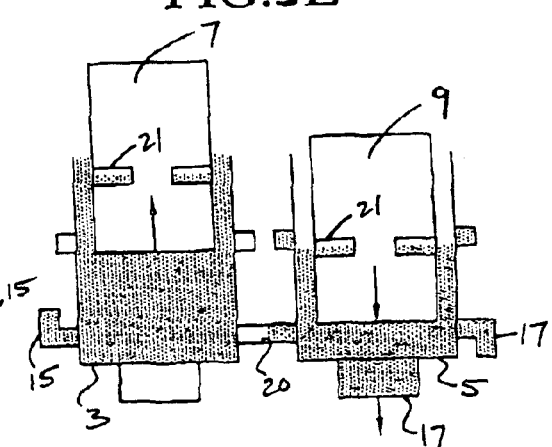

Referring now to FIGS. 3D, 3E, and 3F, these figures illustrate the reverse of the operation illustrated in FIGS. 3A-3C. In FIG. 3D, chamber 5 has been filled with water and buoyant object 9 has completed an upstroke. In order for buoyant object 9 to begin its downstroke, chamber 5's outlets open, as well as do valves 19 connected to manifold 20. Simultaneously, valves 19 connected to chamber 3 open as well as do inlets 15 fluidly connected thereto. In this manner, water exits outlets 17 of chamber 5 and enters chamber 3 via valves 19. Filling of chamber 3 is assisted, of course, with the addition of water from inlets 15. When equilibrium is reached between chambers 3 and 5, once again, valves 19 connected to chamber 3 close while inlets 15 connected thereto remain open until filling thereof is complete. Moreover, outlets 17 connected to chamber 5 remain open until enough water is evacuated therefrom to complete a downstroke. Afterwards, the process repeats itself with water recycling back and forth between the chambers and water being added and removed with inlets and outlets 15 and 17, respectively, thereby to produce alternating upstrokes and downstrokes to produce usable power (e.g. for extraction or storage).

Although the embodiments detailed above have been described employing what are, in essence, two-way valves (e.g. butterfly valves), it is contemplated that a plurality of one-way valves could be used instead or a combination of one-way and two-way valves employed. In an embodiment employing a one-way valve system, each chamber 3 and 5 would include at least two one-way valves oriented oppositely to allow flow in opposite directions (i.e. to allow inflow and outflow of water). It is noted, however, that the one-way valve oriented for water outflow would need a closing mechanism to prevent outflow of water during filling operations. In an embodiment employing a combination of one-way and two-way valves, certain timing issues could be eliminated. In this regard, during a recycling operation between chambers 3 and 5, if appropriate valve orientations are employed, it would not be necessary to close the inflow (one-way) valve of the "filling" chamber once equilibrium between the chambers is reached (because the one-way nature will prevent water loss after equilibrium water levels are surpassed). In such an embodiment, certain efficiencies can be achieved by orienting one-way valves opposite two-way valves located on opposite walls of the manifold/ chambers (to improve flow/filling efficiency).

In particularly preferred embodiments, such as illustrated in FIGS. 3A-3F, each buoyant object includes a ballast compartment which is capable of taking on or dumping ballast at certain phases of upstrokes or downstrokes in order to increase the amount of power produced thereby. For example, as buoyant object 9 is approaching the pinnacle of its upstroke, ballast compartment 21 can be opened (e.g. with conventional valves or ballast compartment doors) thereby to accept water as ballast. Thus, at the time buoyant object 9 has reached the pinnacle of the upstroke, the ballast compartment has filled with water and has an increased effective mass. With such an increased mass, when chamber 5 evacuates (the initiation of which is illustrated in FIG. 3D), buoyant object 9 will produce a more powerful downstroke. Similarly, as the downstroke is being completed (or at completion), the ballast compartments can be opened again and water evacuated therefrom. In this manner, the effective mass of buoyant object 9 can be reduced resulting in an object possessing greater buoyancy. As a result, when chamber 5 is filled again, buoyant object 9 will complete a more powerful upstroke. A complete sequence of this procedure occurring in both buoyant objects 7 and 9 can been seen in FIGS. 3A-3F.

It is noted that the timing of the filling and draining of ballast compartments 21 can be adjusted according to specific operating conditions and apparatus designs. In this regard, while it may be most efficient for one design to begin filling a ballast compartment 21 during the upstroke, in another design it may be most beneficial to fill the ballast compartment only at the pinnacle of an upstroke. Other timings for filling or draining ballast compartments are, of course, contemplated for both upstrokes and downstrokes.

In further preferred embodiments, alternatives to manifold 20 may be employed. In such an embodiment, manifold 20 can be eliminated and simple piping and valves employed to provide the fluid connections between chambers 3 and 5.

In still further preferred embodiments, buoyant objects 7 and 9 are designed with sufficient freeboard such that the top surfaces of the buoyant objects are never covered by water. By designing the objects with freeboard as such, water will not obstruct the upstrokes of the buoyant objects.

In yet further preferred embodiments, an individual chamber housing a single buoyant object with at least one ballast compartment can be employed. Alternatively, three or more chambers can be interconnected with an equivalent number of buoyant objects associated therewith. In such an embodiment, water would be recycled among the various chambers in a manner similar to that described above. It is further noted that in any multiple chamber system, if there is a mechanical failure, less than all of the chambers can be operated to continue to produce power. In such a circumstance, recycling operations can be shut down temporarily with filling and draining being accomplished solely by the flow from upper water body 11 into the chambers with all draining being effected into lower water body 13.

Once given the above disclosure, many other features, modifications, and improvements will become apparent to the skilled artisan. Such other features, modifications, and improvements are therefore considered to be part of this invention, the scope of which is to be determined by the following claims:

I claim:

1. Hydropower generation apparatus comprising:
   a first chamber having at least one inlet for introducing water therein and at least one outlet for evacuating water therefrom;
   a first buoyant object located in said first chamber, said first buoyant object communicating with a power extraction mechanism for extracting generated power;
   a second chamber having at least one inlet for introducing water therein and at least one outlet for evacuating water therefrom;
   a second buoyant object located in said second chamber, said second buoyant object communicating with said power extraction mechanism;
   said first chamber having at least one inlet selectively fluidly connected to an outlet of said second chamber;
   said second chamber having at least one inlet selectively fluidly connected to an outlet of said first chamber;
   wherein introducing water into said first chamber causes said first buoyant object to rise in said first chamber thereby causing an upstroke to generate power;
   wherein evacuating water from said second chamber causes said second buoyant object to fall in said second chamber thereby causing a downstroke to generate power;
   wherein introducing water into said second chamber causes said second buoyant object to rise in said second chamber thereby causing an upstroke to generate power;
   wherein evacuating water from said first chamber causes said first buoyant object to fall in said first chamber thereby causing a downstroke to generate power;
   wherein said first chamber is capable of selectively evacuating water to said second chamber to assist in an upstroke of said second buoyant object in said second chamber, and said first chamber is capable of selectively evacuating water from said first chamber to a lower water body; and
   wherein said second chamber is capable of selectively evacuating water to said first chamber to assist in an upstroke of said first buoyant object in said first chamber, and said second chamber is capable of selectively evacuating water from said second chamber to a lower water body;
   wherein at least one inlet each of said first and second chambers is fluidly connected to an upper water body, said upper water body being located at an elevation higher than said chambers; and wherein at least one outlet each of said first and second chambers is fluidly connected to a lower water body, said lower water body being located at an elevation lower than said chambers; and
   further including a turbine located at a position selected from:
   a) in fluid communication between said upper water body and said at least one inlet; and
   b) in fluid communication between said at least one outlet and said lower water body.

2. Hydropower generation apparatus according to claim 1 wherein said turbine is so located in said fluid communication such that water flow through said turbine generates power which is storable.

3. Hydropower generation apparatus according to claim 2 wherein said apparatus includes at least:
   a) a first turbine located in fluid communication between said upper water body and said at least one inlet; and
   b) a second turbine located in fluid communication between said at least one outlet and said lower water body.

4. Hydropower generation apparatus according to claim 2 wherein power is generated by said upstrokes by means of rapid introduction of water through said inlets sufficient to cause a positive upward buoyant force on said buoyant objects up to and including near instantaneous flooding of said chambers; and power is generated by said downstrokes of said first and said second buoyant objects through rapid evacuation of water from said chambers via said outlets sufficient to cause a positive downward gravitational force up to and including near instantaneous evacuation of said chambers.

5. Hydropower generation apparatus according to claim 2 further including means for guiding said first and second buoyant objects in vertical motion during said upstrokes and downstrokes in said first and said second chambers respectively.

6. Hydropower generation apparatus according to claim 2 wherein said first and said second buoyant objects weigh less than or equal to the volume of water required to raise said buoyant objects through a lift distance between a surface of said lower water body and a surface of said upper water body.

7. Hydropower generation apparatus according to claim 2 wherein said first and second buoyant objects are so sized and so designed such that sufficient freeboard is maintained by said buoyant objects within said first and said second chambers respectively thereby to substantially prevent water from contacting a top surface of said buoyant objects and thus prevent water from obstructing said buoyant objects during said upstrokes.

8. Hydropower generation apparatus according to claim 2 wherein space clearances between said first and second buoyant objects in said first and second chambers, respectively, are minimized in order to minimize the amount of water required in order to produce positive forces on said buoyant objects in said chambers.

9. Hydropower generation apparatus according to claim 2 further including a plurality of two-way valves selectively fluidly connecting said first and said second chambers respectively.

10. Hydropower generation apparatus according to claim 8 further including a manifold located between said first and said second chambers, said manifold being fluidly connected to said first and said second chambers via said plurality of two-way valves.

11. Hydropower generation apparatus according to claim 9 wherein said plurality of two-way vales are selectively fluidly connected for directing water back and forth between said first chamber and said second chamber, via said manifold, thereby to introduce water into one of said chambers when the other of said chambers is being evacuated of water thereby to enhance said upstrokes and downstrokes of said chambers simultaneously respectively.

12. Hydropower generation apparatus according to claim 10 wherein said manifold includes at least one drainage valve for draining water into said lower water body and at least one filling valve selectively fluidly connected to said upper water body.

13. Hydropower generation apparatus according to claim 2 wherein said first and said second buoyant objects each include ballast compartments and ballast valves for opening and closing said ballast compartments, wherein said ballast valves of said ballast compartments are operable to take on water in order to increase the weight of said first and said second buoyant objects during their downstrokes, respectively, and said ballast valves are operable to evacuate water from said ballast compartments in order to decrease the weight of said first and said second buoyant objects during their upstrokes, respectively.

14. Hydropower generation apparatus according to claim 13 wherein said ballast compartments are operable to take on water at or near a pinnacle of an upstroke thereby to maximize energy generated in said downstrokes and are operable to release water at or near a bottom of said downstroke thereby to maximize energy generated in said upstroke.

15. Hydropower generation apparatus according to claim 13 wherein power is generated by said upstrokes by means of rapid introduction of water through said inlets sufficient to cause a positive upward buoyant force on said buoyant objects up to and including near instantaneous flooding of said chambers; and power is generated by said downstrokes of said first and said second buoyant objects through rapid evacuation of water from said chambers via said outlets sufficient to cause a positive downward gravitational force up to and including near instantaneous evacuation of said chambers.

16. Hydropower generation apparatus according to claim 13 further including means for guiding said first and second buoyant objects in vertical motion during said upstrokes and downstrokes in said first and said second chambers respectively.

17. Hydropower generation apparatus according to claim 13 wherein said first and said second buoyant objects weigh less than or equal to the volume of water required to raise aid buoyant objects through a lift distance between a surface of said lower water body and a surface of said upper water body.

18. Hydropower generation apparatus according to claim 13 wherein said first and second buoyant objects are so sized and so designed such that sufficient freeboard is maintained by said buoyant objects within said first and said second chambers respectively thereby to substantially prevent water from contacting a top surface of said buoyant objects and thus prevent water from obstructing said buoyant objects during said upstrokes.

19. Hydropower generation apparatus according to claim 13 wherein space clearances between said first and second buoyant objects in said first and second chambers, respectively, are minimized in order to minimize the amount of water required in order to produce positive forces on said buoyant objects in said chambers.

20. Hydropower generation apparatus according to claim 13 further including a plurality of one-way and two-way valves selectively fluidly connecting said first and said second chambers respectively.

21. Hydropower generation apparatus according to claim 13 further including a manifold located between said first and said second chambers, said manifold being fluidly connected to said first and said second chambers via said plurality of one-way and two-way valves.

22. Hydropower generation apparatus according to claim 21 wherein said plurality of one-way valves and two-way vales are selectively fluidly connected for directing water back and forth between said first chamber and said second chamber, via said manifold, thereby to introduce water into one of said chambers when the other of said chambers is being evacuated of water thereby to enhance said upstrokes and downstrokes of said chambers simultaneously respectively.

23. Hydropower generation apparatus according to claim 21 wherein said manifold includes at least one drainage valve for draining water into said lower water body and at least one filling valve selectively fluidly connected to said upper water body.

\* \* \* \* \*